United States Patent [19]

Shih et al.

[11] Patent Number: 4,835,632
[45] Date of Patent: May 30, 1989

[54] DISK FILE DIGITAL SERVO CONTROL SYSTEM WITH MULTIPLE SAMPLING RATE

[75] Inventors: Shih-Ming Shih; Richard J. Spanel; Kenneth G. Yamamoto; Mantle M. Yu, all of San Jose, Calif.

[73] Assignee: International Business Machines Corporation, Armonk, N.Y.

[21] Appl. No.: 97,779

[22] Filed: Sep. 16, 1987

[51] Int. Cl.$^4$ ........................ G11B 21/08; G11B 21/10
[52] U.S. Cl. ............................... 360/78.04; 360/77.02; 318/561; 318/594
[58] Field of Search .................................. 360/77, 78; 364/148–151, 167–170; 318/561, 567, 569, 571, 590, 592, 594, 568, 600, 632, 615–617, 636, 687; 369/32, 33, 41, 43

[56] References Cited

U.S. PATENT DOCUMENTS

| | | | |
|---|---|---|---|
| 4,103,314 | 7/1978 | Case | 360/78 |
| 4,412,161 | 10/1983 | Cornaby | 318/561 |
| 4,679,103 | 7/1987 | Workman | 360/77 |
| 4,697,127 | 9/1987 | Stich et al. | 318/561 |
| 4,751,441 | 6/1988 | Lewis | 318/561 |

OTHER PUBLICATIONS

*Digital Control of Dynamic Systems*, Franklin and Powell, Addison-Wesley Publishing Co. (1983) Chapter 6, pp. 131–139.
*Computer Controlled Systems Theory and Design*, Karl Astrom and Bjorn Wittenmark, Prentice-Hall, Inc., Englewood Cliffs, N.J. 07632, (1984), Chapter 4, pp. 88–92.

*Primary Examiner*—Alan Faber
*Assistant Examiner*—Steven R. Garland
*Attorney, Agent, or Firm*—Thomas R. Berthold

[57] ABSTRACT

A digital servo control system in a data recording disk file has a single processor which generates the control signal to the actuator at two different rates, depending on whether the read/write head is being moved between data tracks or is following a specific track. A sampling clock generator receives servo timing information from a recorded servo disk surface and generates interrupt signals to the processor at predetermined frequencies selected by the time required for the processor to run the algorithm which generates the control signals. Upon receipt of a seek command to move the head of a target track, or a predetermined head position error signal indicative of arrival of the head to the target track, the microprocessor enables or disables appropriate interrupts so as to select one of the appropriate rates for generating the control signals. The digital servo control system thus allows servo position information to be sampled at a higher frequency during track following.

5 Claims, 3 Drawing Sheets

DISK FILE DIGITAL SERVO CONTROL SYSTEM WITH MULTIPLE SAMPLING RATE

TECHNICAL FIELD

This invention relates to servo control systems for read/write head positioning in data recording disk files. More particularly, the invention relates to a digital servo control system which samples servo position information at different rates, depending on whether the head is following a specific data track or is being moved from one track to another track.

BACKGROUND OF THE INVENTION

Disk files are information storage devices which utilize a rotatable disk with concentric data tracks containing the information, a head for reading or writing data onto the various tracks, and an actuator connected by a support arm assembly to the head for moving the head to the desired track and maintaining it over the track centerline during read or write operations. The movement of the head to a desired track is referred to as track accessing or "seeking", while the maintaining of the head over the centerline of the desired track during a read or write operation is referred to as track "following".

The actuator is typically a "voice coil motor" (VCM) which comprises a coil movable through the magnetic field of a permanent magnetic stator. The application of current to the VCM causes the coil, and thus the attached head, to move rapidly. The acceleration of the coil is proportional to the applied current, so that ideally there is no current to the coil if the head is perfectly stationary over a desired track.

In disk files which have a relatively high density of data tracks on the disk, it is necessary to incorporate a servo control system to maintain the head precisely over the centerline of the desired track during read or write operations. This is accomplished by utilizing prerecorded servo information either on a dedicated servo disk or on sectors angularly spaced and interspersed among the data on a data disk. The servo information sensed by the read/write head (or the dedicated servo head if a dedicated servo disk is used) is demodulated to generate a position error signal (PES) which is an indication of the position error of the head away from the nearest track centerline.

In a disk file digital servo control system, a microprocessor utilizes a control signal algorithm to calculate a digital control signal based upon the digital values of certain state variables such as PES, VCM current and head velocity. The digital control signal is converted to an analog signal and amplified to provide input current to the VCM. Such a digital servo control system is described in U.S. Pat. No. 4,412,161, wherein the digital control signal is calculated recursively from prior control signals and prior values of the PES.

A recent development in digital disk file servo control systems, as described in assignee's U.S. Pat. No. 4,679,103, is a digital servo control system which, as part of the computation of the control signal to the actuator, makes use of a state estimator algorithm to estimate the position and velocity of the head. In this type of system, a microprocessor receives, at discrete sample times, digital values corresponding to the PES and the actuator input current, and computes, through the use of the state estimator algorithm, a digital control signal. The digital control signal is then converted to an analog signal and amplified to provide a new actuator input current. The method of estimating the state of the physical plant to be controlled in such a digital servo control system requires the use of estimator constants, the derivation of which is described in *Digital Control of Dynamic Systems*, Franklin and Powell, Addison-Wesley Publishing Co. (1983), chapter 6, pages 131–139. In the case of a disk file, these estimator constants are dependent upon the values of certain physical parameters of the disk file, such as the mass of the coil and head/arm assembly, the actuator force constant (the force applied to the coil per unit of input current), the gain of the VCM power amplifier, the PES gain and the time between PES samples (the PES sampling time).

In digital servo control systems, the PES is available to the microprocessor at a much higher rate than the rate at which the microprocessor is capable of generating the control signal. The time for the microprocessor to compute successive control signals during track seeking is substantially greater than the time to compute successive control signals during track following because of the increased complexity of the seek control signal algorithm. Thus, even though the PES is available during track following at a much higher rate than the rate at which the control signal is generated, the digital servo control system cannot take advantage of the availability of the PES because it is constrained by the relatively slow PES sampling rate required during track seeking. During track following, the PES does not remain precisely at zero (and thus the head does not remain precisely over the track centerline). Rather, the PES experiences nonrepeatable runout caused by such factors as drive motor bearing inaccuracy, disk media defects and PES quantization errors. In order to optimize the disk file operation during track following, it is therefore desirable to reduce the effect of nonrepeatable runout by substantially increasing the PES sampling rate.

SUMMARY OF THE INVENTION

The present invention is a disk file digital servo control system which utilizes a single microprocessor operating at different PES sampling rates, depending on whether the disk file is track seeking or track following. In a preferred embodiment the PES clock signal generated from the demodulated servo timing information is input to a sampling clock generator which generates two output signals. These two output signals provide two separate interrupts to the microprocessor. When a seek command is received from the disk file control unit, one of the microprocessor interrupts is disabled. This permits the microprocessor to run the seek control signal algorithm at a slower rate than the rate for running the track following control signal algorithm. When the head is substantially close to the target track centerline at the end of the seek, the disabled interrupt is again enabled. At this time, both microprocessor interrupts are enabled, which permits the microprocessor to operate at a higher PES sampling rate, thereby improving the performance of the disk file during track following.

For a fuller understanding of the nature and advantages of the present invention, reference should be made to the following detailed description taken in conjunction with the accompanying drawings.

DESCRIPTION OF THE PREFERRED EMBODIMENTS

Figure 1:
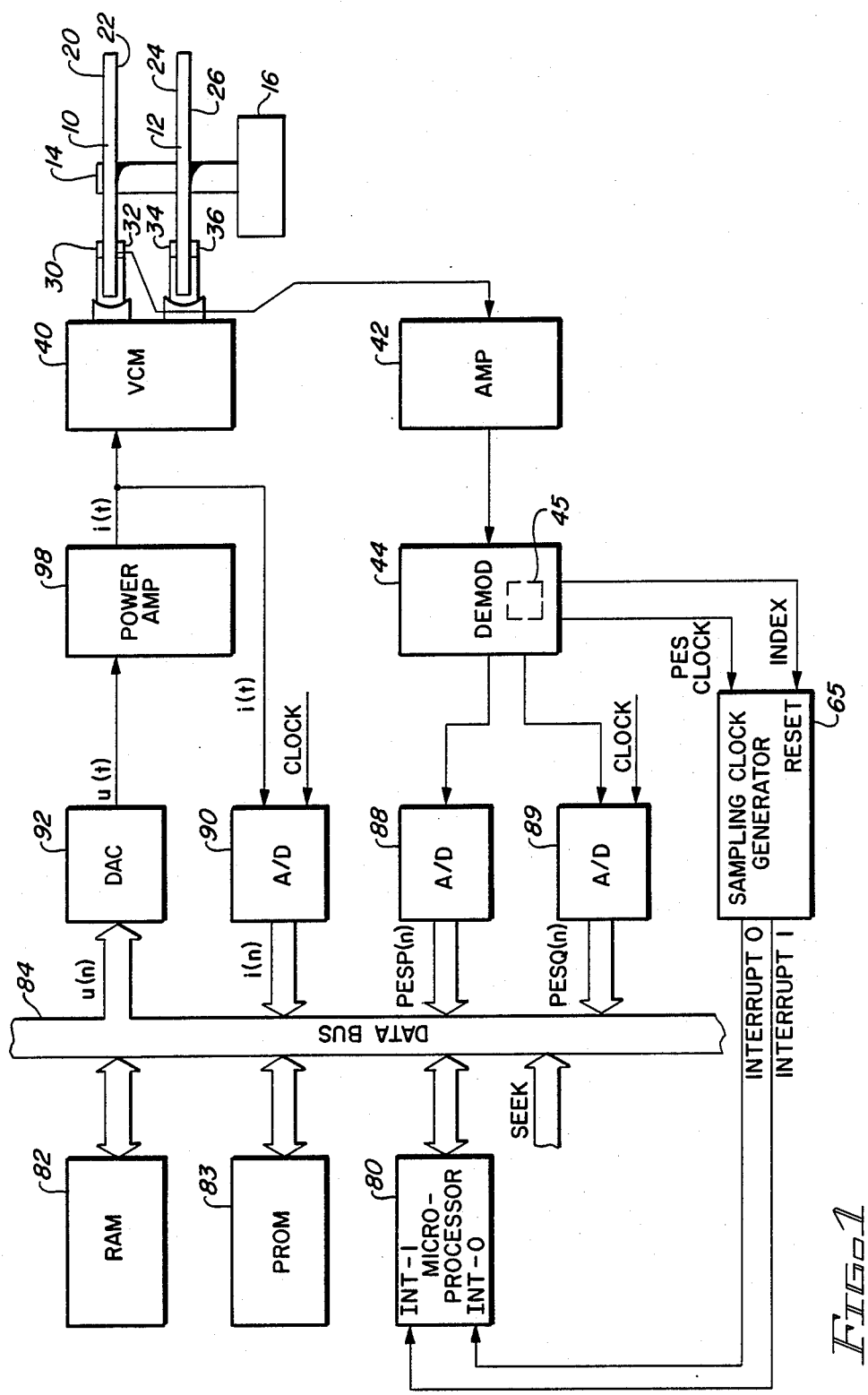
FIG. 1 is a block diagram of the digital servo control system of the present invention.

Referring first to FIG. 1, there is depicted a simplified block diagram of the digital servo control system and the means for generating the two PES sampling clock rates. A pair of disks 10, 12 are supported on a spindle 14 of the disk file drive motor 16. Each of the disks 10, 12 has two surfaces 20, 22 and 24, 26, respectively. For purposes of this description, surface 20 on disk 10 and surfaces 24, 26 on disk 12 are data recording surfaces. Surface 22 on disk 10 is a dedicated servo surface and contains only prerecorded servo information.

Figure 2:
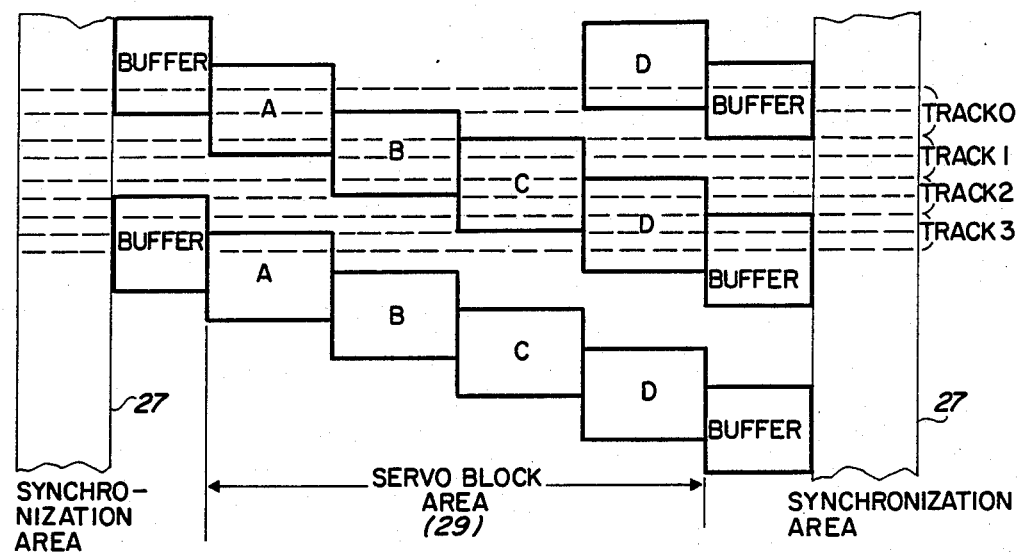
FIG. 2 is an illustration of servo timing information and servo position information recorded in the form of a quadrature pattern.

The servo information on disk 10 is recorded in concentric tracks, with the position information typically written in such a manner that the intersections of adjacent servo tracks on servo surface 22 are radially aligned with the centerlines of the data tracks on surfaces 20, 24, and 26. A conventional quadrature servo pattern is depicted in FIG. 2. The servo pattern includes a synchronization area 27, which provides timing information corresponding to the beginning of a set of servo position blocks, and servo block area 29, which provides head position information.

The specific tracks on the data disks and the servo disks are accessed by heads 30, 32, 34, 36, each of which is associated with a respective disk surface and supported by an associated arm assembly. The heads 30, 32, 34, 36 are attached to a common accessing means or actuator, such as VCM 40. Thus the heads 30, 32, 34, 36 are all maintained in a fixed relationship with one another relative to the radial position on their respective disk surfaces.

The signal read by servo head 32 is input to amplifier 42 and then demodulator 44. While the invention is operable with any of numerous types of servo patterns and servo signal demodulation techniques, the servo control system will be explained with reference to the quadrature servo pattern, as represented in FIG. 2. The servo position information in block area 29 in the quadrature pattern on servo surface 22 is demodulated by demodulator 44 to generate two separate analog waveforms, designated primary (PESP) and quadrature (PESQ), as shown in FIG. 1. The analog PESP and PESQ signals from demodulator 44 are sent to analog-to-digital (A/D) converters 88, 89, respectively. The discrete values of PESP and PESQ at any sample time are designated PESP(n) and PESQ(n), where n represents a time index for each digital sample.

A microprocessor 80 is connected by data bus 84 and suitable address bus (not shown) to suitable memory devices, such as read/write memory (RAM) 82 and programmable read only memory (PROM) 83. Microprocessor 80 utilizes a control signal algorithm, as described in the '103 patent, to generate a control signal u(n). The control signal u(n) is output to digital-to-analog converter (DAC) 92 and amplified by power amplifier 58 to generate an analog current i(t) to VCM 40. The analog current i(t) is fed back to analog-to-digital (A/D) converter 90, which provides a digital current signal i(n) to microprocessor 80. Microprocessor 80 thus receives as inputs, at discrete sample times, the digital actuator current i(n) and the digital head position error signals PESP(n) and PESQ(n). microprocessor 80 computes the actual position error signal PES(n) from the values of PESP(n) and PESQ(n), using conventional logic, as described in the '103 patent. Also shown as input to microprocessor 80 via data bus 84 is a seek command signal from the disk file control unit (not shown). The seek command signal is a digital value which identifies the target track to which the heads are to be re-positioned.

As previously described, demodulator 44 demodulates the position information in servo block area 29 from the quadrature servo pattern (FIG. 2) to generate analog PESP and PESQ signals. Demodulator 44 also contains synchronization detection circuitry 45 which receives the timing information from the synchronization areas 27 of the quadrature servo pattern and outputs a PES clock signal. The PES clock signal is output by synchronization detection circuitry 45 at a frequency corresponding to the rate at which the synchronization areas 27 in the servo pattern pass beneath the servo head 32. Thus the PES clock frequency is determined by the number of discrete sets of servo position blocks 29, (and thus the number of corresponding synchronization areas 27) recorded either on the dedicated servo disk or in sectors on the data disk, and the rotational speed of the drive motor 16. Since the number and spacing of recorded synchronization areas 27 are fixed, the PES clock frequency is solely a function of the rotational speed of drive motor 16.

The PES clock signal synchronization detection circuitry 45 is input to a sampling clock generator 65 which provides two interrupt signals (INT-0, INT-1) to microprocessor 80. Sampling clock generator 65 may be a digital counter which divides the PES clock frequency by a fixed value to provide each interrupt signal INT-0 and INT-1 at a frequency substantially slower than the PES clock input frequency. The digital counter is reset for every revolution of the drive motor 16 by an index pulse which is recorded on servo disk surface 22 and which identifies the beginning of a servo track.

In one embodiment of the invention, the combination of the synchronization areas 27 recorded on the disk and the nominal speed of drive motor 16 results in a PES clock frequency of approximately 3 MHz, corresponding to a time between PES clock pulses of approximately 330 nanoseconds (ns). The sampling clock generator 65 is a divide-by-336 digital counter. Thus, the frequency of interrupt signal INT-0 and interrupt signal INT-1 generated by the sampling clock generator 65 in response to this nominal PES clock input frequency is approximately 8.9 kHz (3 MHz/336). This corresponds to a time between each INT-0 signal and each INT-1 signal of approximately 112 microseconds.

Figure 3:
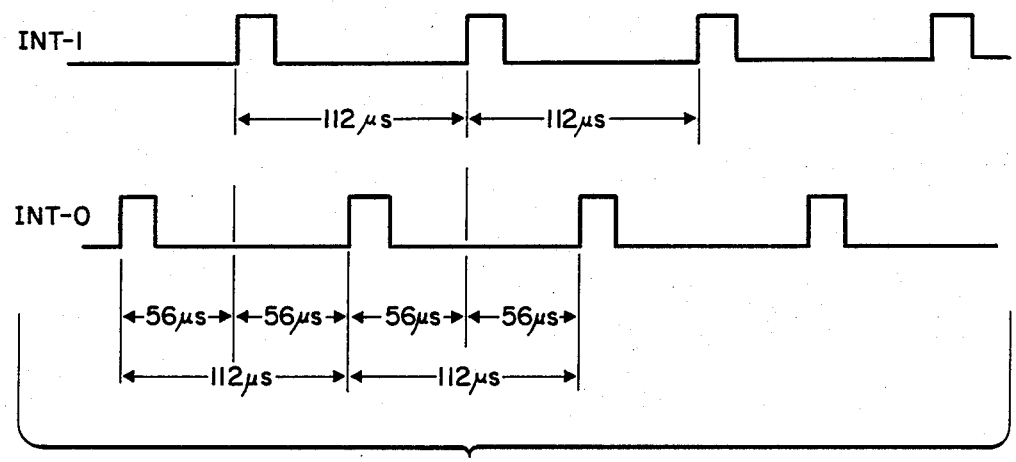
FIG. 3 is a timing pattern of the two interrupt signals from the sampling clock generator.

Referring now to FIG. 3, the signals INT-0 and INT-1 are output by sampling clock generator 65 out of phase by one-half pulse width. Thus, if both INT-0 and INT-1 interrupts are enabled in microprocessor 80, microprocessor 80 will receive an interrupt approximately every 56 microseconds. This interrupt rate corresponds to the PES sampling rate during track following. If INT-1 is disabled, however, the microprocessor 80 will receive an interrupt (INT-0) only approximately every 112 microseconds, which corresponds to the nominal PES sampling rate during track seeking.

In all digital servo control systems, the control signal can be represented as a ratio of two polynomial functions of the state variables, wherein the polynomials include control constants as the coefficients. In the case of a digital servo control system such as that described in the '103 patent, wherein the control signal computation includes a state estimator, the control constants include estimator constants referred to as $g_{ij}$ and $p_{ij}$. These estimator constants are functions of PES sampling time. Thus, with the present invention either two sets of control constants must be stored in PROM 83, or the control constants must be re-calculated when the microprocessor 80 switches from computation of the track seeking algorithm to the track following algorithm.

The state variables in a digital servo control system, e.g. PES and VCM current, have different dynamic ranges during track seeking and track following. Thus, if two different PES sampling rates are to be used, it is desirable to rescale the state variables when switching from track seeking to track following. This has the advantage of reducing the quantization errors in the PES, which substantially improves the performance of the disk file by reducing the contribution to nonrepeatable runout caused by PES quantization errors, For example, if microprocessor 80 is a 16 bit microprocessor, then the PES quantization will be $\frac{1}{2}^{15}$. Thus, if a single PES sampling rate, corresponding to the time to run the seek control signal algorithm, is used, a single bit will correspond to $\frac{1}{2}^{15}$-th of a relatively wide range of PES values. Since during track following the PES range is substantially less, the state variables are rescaled so that a single bit has a much smaller value. In the present invention, the state variables are rescaled when the PES sampling rate is increased during track following by dividing the state variable range by a fixed value, e.g. 32.

Figure 4:
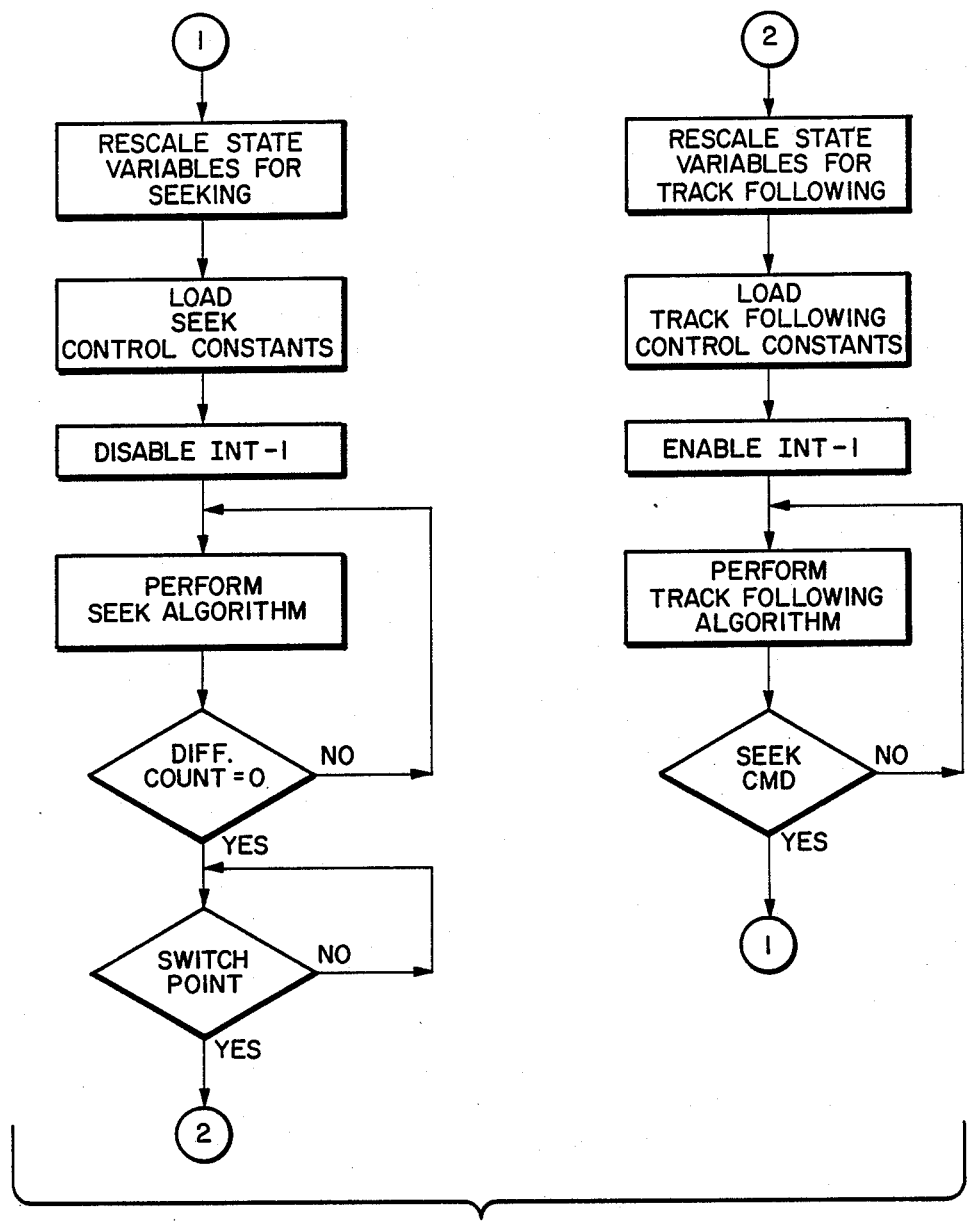
FIG. 4 is a flow chart illustrating the manner in which the PES sampling rate is changed during track seeking and track following.

Referring now to FIG. 4, there is depicted a flow chart illustrating the steps for switching the PES sampling rate of the digital servo control system between track seeking and track following. When a seek command is first received by microprocessor 80 along data bus 84 (FIG. 1) the state variables are rescaled and the seek control constants, including the $p_{ij}$ and $g_{ij}$ estimator constants, are loaded from PROM 83 into RAM 82. The values of the estimator constants are predetermined based upon the known nominal PES sampling time for track seeking. Following the rescaling of the state variables and the loading of the seek control constants, the INT-1 interrupt of microprocessor 80 is disabled. The seek control signal algorithm is then initiated by receipt of the next INT-0 signal from sampling clock generator 65. At the completion of one cycle of the seek algorithm the digital control signal "u" is output to DAC 92 (FIG. 1), and shortly thereafter the next INT-0 signal is received, indicating the beginning of the next successive running of the seek algorithm. The time between INT-0 interrupts is preselected by design of the sampling clock generator 65 so as to be slightly greater than the time required for microprocessor 80 to complete the seek control signal algorithm.

The seek algorithm continues to cycle until the difference count between the track at which the head is located and the target track equals zero. If the difference count equals zero, indicating that the head is within one-half track of the target track, then the track following sequence will be initiated when the "switch point" is reached. The switch point is reached when the PES is at a predetermined value selected to minimize any transients occurring during switching, yet to assure that switching does not occur during a read or write operation. When the switch point is reached, the state variables are rescaled for track following, in order to reduce the PES quantization errors, and the track following control constants are loaded from PROM 83 into RAM 82. Thereafter interrupt INT-1 is enabled in microprocessor 80, so that microprocessor 80 will receive two interrupts, INT-0 and INT-1, separated by approximately 56 microseconds. Thus, in the described embodiment the track following PES sampling rate is twice as fast as the track seeking PES sampling rate. The microprocessor 80 then performs the track following control signal algorithm, which requires substantially less time than that required to perform the seek algorithm. The running of the track following algorithm continues until the next seek command is received.

While the preferred embodiments of the present invention have been illustrated in detail, it should be apparent that modifications and adaptions to those embodiments may occur to one skilled in the art without departing from the scope of the present invention as set forth in the following claims.

What is claimed is:

1. An improved data recording disk file of the type having at least one rotatable disk with generally concentric data tracks thereon, the data disk or a separate servo disk having servo information recorded thereon, at least one head for reading the servo information during rotation of the disk, means for deriving from the servo information a head position error signal (PES) and a PES clock signal, an actuator responsive to an input signal and attached to the head for causing the head to seek between tracks and to follow a specific track, and computing means for receiving digital values corresponding to PES samples and for computing a digital control signal for use by the actuator, wherein the improvement comprises:

means coupled between said PES clock signal deriving means and said computing means for generating timing signals to said computing means; and wherein said computing means includes means responsive to said timing signals for generating a digital control signal at a first rate during track seeking and at a faster second rate during track following, and means for scaling the digital values of PES samples at a first range when said control signal is generated at said first rate and for rescaling the digital values of PES samples at a second lesser range when said control signal is generated at said second rate.

2. An improved data recording disk file of the type having at least one rotatable disk with generally concentric data tracks thereon, the data disk or a separate servo disk having servo information recorded thereon, at least one head for reading the servo information during rotation of the disk, means for deriving from the servo information a head position error signal (PES) and a PES clock signal, an actuator responsive to an input signal and attached to the head for causing the head to seek between tracks and to follow a specific track, and computing means for receiving digital values corresponding to PES samples and for computing a digital control signal for use by the actuator, wherein the improvement comprises:

means coupled between said PES clock signal deriving means and said computing means for generating timing signals to said computing means, said timing signal generating means further comprising means for generating a first interrupt to the computing means in response to receipt of a predetermined number of PES clock signals and means for generating a second interrupt to the computing means in response to receipt of a predetermined number of PES clock signals; and wherein said computing means includes means responsive to said interrupts for generating a digital control signal at a first rate during track seeking and at a faster second rate during track following.

3. The improved disk file according to claim 2 wherein the predetermined number of PES clock signals to which the first and second interrupt generating means is responsive is the same, and wherein said second interrupt generating means includes means for generating said second interrupt mid-way between successive interrupts from said first interrupt generating means.

4. An improved data recording disk file of the type having at least one rotatable disk with generally concentric data tracks thereon, the data disk or a separate servo disk having servo information recorded thereon, at least one head for reading the servo information during rotation of the disk, means for deriving from the servo information a head position error signal (PES) and a PES clock signal, an actuator responsive to an input signal and attached to the head for causing the head to seek between tracks and to follow a specific track, and a processor coupled to the PES deriving means for receiving digital values of discrete PES samples and for generating, from the running of a control signal algorithm, a digital control signal for use by the actuator, said processor having a plurality of interrupt ports and including means for estimating head position and velocity from, among other things, estimator constants, the estimator constants being determined by disk file physical parameters including the time between successive PES samples received by the processor, wherein the improvement comprises:

means responsive to the PES clock signal for generating interrupt signals to the processor at two frequencies corresponding to two PES sampling rates; and wherein said processor includes means responsive to said interrupt signals for generating said digital control signal at a first rate during track seeking and at a second rate during track following.

5. The improved disk file according to claim 4 further comprising a memory device coupled to said processor for storing two sets of estimator constants, and wherein said processor includes means for loading a selected set of said estimator constants into said algorithm in response to a selected control signal generation rate.

* * * * *